United States Patent [19]

Horie

[11] Patent Number: 5,684,947
[45] Date of Patent: Nov. 4, 1997

[54] PERFORMANCE EVALUATION METHOD AND DEVICE THEREOF FOR A PARALLEL COMPUTER

[75] Inventor: Takeshi Horie, Kawasaki, Japan

[73] Assignee: Fujitsu Limited, Kawasaki, Japan

[21] Appl. No.: 456,615

[22] Filed: Jun. 1, 1995

Related U.S. Application Data

[63] Continuation of Ser. No. 993,231, Dec. 17, 1992, abandoned.

[30] Foreign Application Priority Data

Dec. 26, 1991 [JP] Japan ................ 3-345042

[51] Int. Cl.$^6$ .................................................. G06F 11/00
[52] U.S. Cl. ............................ 395/183.13; 395/183.21; 395/185.04
[58] Field of Search ................ 395/183.21, 183.13, 395/183.14, 183.15, 183.22, 183.09, 185.08, 185.04

[56] References Cited

U.S. PATENT DOCUMENTS 4,924,383  5/1990  Suzuki ........................ 364/200
5,072,371  12/1991  Benner et al. ................ 395/200

OTHER PUBLICATIONS

Jefferson et al "Supercritical Speedup" 1991 Simulation Symposium IEEE pp. 159–168.
Beckmann et al "Fast Barrier Synchronization Hardware" Supercomputing 1990 IEEE pp. 180–189.
Lee "Barrier Synchronization Over Multistage Interconnection Networks" Parallel and Distributed Processing 1990 (Proceedings) IEEE pp. 130–133.
Wolfe "Multiprocessor Synchronization for Concurrent Loops" Parallel Programming IEEE Software pp. 34–41.
Miller et al "IPS-2: The Second Generation of a Parallel Program Measurement System" IEEE Trans. on Parallel and Distributed Systems 1990 pp. 206–217.

Yu et al "A New Parallel LU Decomposition Method" IEEE Trans. on Power Systems, 1990 pp. 303–309.
Beaven et al "VERT—Verification of Real Time Programs" Computer Software and Applications Conference 1991 COMPSAL pp. 618–625.
Kitamura "Exact Critical Path Tracing Fault Simulator on Massively Parallel Processor AAP2" Computer Aided Design, 1989 Int. Conf. IEEE pp. 474–477.
Markatos et al "The Effects of Multiprogramming on Barrier Synchronization" Parallel ad Distributed Processing 1991 Proceedings IEEE pp. 662–669.
Shaffer "Parallel Implementation of Real-Time Control Programs" Decision and Control, 1988 27th Ann. Conf. IEEE pp. 1449–1454.

(List continued on next page.)

Primary Examiner—Robert W. Beausoliel, Jr.
Assistant Examiner—Joseph E. Palys
Attorney, Agent, or Firm—Staas & Halsey

[57] ABSTRACT

A performance evaluation for a parallel computer which carries out parallel processing in multiple processor by means of transmitting or receiving a message among the processors. Execution starting time, standby starting time for waiting reception of the message, message number on reception of the message, processor number of the processor, the message and time when the message is received, message number on transmitting of the message and time when the message execution ending time are memorized. A maximum delay path is determined for the execution which has lastly been ended, the standby starting time for waiting reception of the message in the last ending processor, the message number of the last ending processor, the transmitting processor number and the message transmitting processor corresponding to the transmitting processor number. Processing is repeatedly carried out from the last ending processor to starting processor where execution of the parallel processing is started. Thus, the maximum delay path is identified.

21 Claims, 14 Drawing Sheets

OTHER PUBLICATIONS

Hollingsworth et al "Parallel Program Performance Metrics: A Comparison and Validation" Supercomputing 1992, IEEE pp. 4–13.

Wieland et al "A Critical Path Tool for Parallel Simulation Performance Optimization" System Sciences, 1992 Annual Hawaii Int'l Conf. IEEE pp. 196–206.

Heath et al "Visualizing the Performance of Parallel Programs", IEEE—May 1990, pp. 29–39.

Kaelbling et al "Minimizing Monitoring Costs: Choosing Between Tracing & Sampling" 1990 IEEE, pp. 314–320.

Hsu et al "Performance Measurement and Trace Driven Simulation of Parallel CAD and Numeric Application on a Hypercube Multicomputer" 1990 IEEE pp. 260–269.

Sharma et al "Run Time Monitoring of Concurrent Programs on the Cedar Multiprocessor" May 1990, IEEE pp. 784–793.

Azimi et al "A Software Approach to Multiprocessor Address Trace Generation" May 1990, IEEE, pp. 99–105.

Yang et al "Critical Path Analysis for the Execution of Parallel & Distributed Programs" Jan. 1988 IEEE, pp. 366–373.

Ghose et al "A High Performance Barrie Synchronizer and its Novel Applications in Highly Parallel Systems" IEEE pp. 616–619.

PERFORMANCE EVALUATION METHOD AND DEVICE THEREOF FOR A PARALLEL COMPUTER

This application is a continuation of application Ser. No. 07/993,231, filed Dec. 17, 1992, now abandoned.

BACKGROUND OF THE INVENTION

This invention relates to a performance evaluation method and a device thereof for a parallel computer which carries out parallel processing in multiple processor by means of transmitting or receiving a message among a plurality of processors.

With the demand for high-speed large-capacity computer systems, a technique is required for connecting a large number of processors in such a manner so as to decentralize the processing. Thus, a "parallel" computer has been proposed in which a large number of simple structured processors are connected with each other. In such a parallel computer, parallel processing is carried out in each processor by means of message communication. Therefore, accurate determination of the operational rate of all processors is particularly important.

It is known to measure communication time interval, barrier synchronous time interval barrier synchronous time interval and executing time interval among the processors during parallel processing. The performance of the parallel computer is analyzed based on the ratio of the communication time interval and the barrier synchronous time interval. However, this ratio is insufficient to analyze performance deterioration in a parallel computer.

For example, when a message is transmitted from processor A to processor B and processor C, the entire processing time can be reduced by first transmitting the message to the processor C rather than the processor B, if processor C is ready and able to receive the message.

As the conventional testing method only obtains the ratio of the communication time interval to the synchronous time interval, it is impossible to determine whether the message transmission from processor A to processor C is a cause of performance deterioration in the parallel computer.

In other words it is possible to find overhead due to communication, but is impossible to determine the cause of the performance. In addition, this method typically displays all of the message flow rather than just the message flow affecting the deterioration of the performance.

SUMMARY OF THE INVENTION

An object of the present invention is to provide a process performance evaluation method and a device thereof for a parallel computer which obtains and displays a maximum delay path indicating the cause of performance deterioration.

This object is achieved in an evaluation method for a parallel computer by transmitting or receiving a message among a plurality of processors, followed by a memorizing step and a maximum delay path obtaining step. The maximum delay path is detected by tracing a messages transmitting route from the last processor in which the execution was completed to the processor from where the message originated. The memorizing step memorized information showing the message transmitting route. The maximum delay path obtaining step searches for the last processor and traces the route taken by the message.

In the memorizing step, various pieces of information are memorized in each processor during parallel processing. In the maximum delay path obtaining step, the maximum delay path is obtained, after the execution of the parallel processing has been completed, using the information memorized in the memorizing step.

The maximum delay path represents a route through which the message has passed from a starting processor, where the message originated to an ending processor which was the last to complete execution during parallel processing.

The memorizing step includes five sub-steps. The first memorizing step is memorizing an execution starting time of the parallel processing.

The second memorizing step is memorizing a standby starting time for the reception of the message. After the standby starting time, a processor can receive a message from another processor at any time.

The third memorizing step is memorizing a message number on reception of the message received by the processor, a processor number of the processor which transmits the message and the time when the message is received by the processor.

The fourth memorizing step is memorizing the message number upon transmitting of the message and memorizing the time when the message is transmitted from the processor.

The fifth memorizing step is memorizing the execution ending time for each processor.

The maximum delay path obtaining step includes four substeps.

The first path obtaining step is searching for the last processor to complete execution based on the ending times obtained in the fifth memorizing step.

The second path obtaining step is searching for the standby starting time, obtained in the second memorizing step, carried out by the last processor, as obtained in the first path obtaining step.

The third path obtaining step is searching for the message number, transmitting processor number and message receiving time, which are obtained in the third memorizing step, in the last processor.

The fourth path obtaining step is searching for the message transmitting processor corresponding to transmitting processor number.

To obtain the maximum delay path, the first through fourth path obtaining step are repeated for each processor from the last processor to the starting processor.

According to the above method, in each processor the memorizing step memorizes the execution starting time, the standby starting time for reception of the message, the message reception time and the message number on reception of the message, the transmitting processor number, message transmitting time and message number on transmitting the message and execution ending time. In each processor the maximum delay path step subsequently searches the processor in which the execution has lastly been ended, the standby starting time for reception of the message in the last ending processor, the message number of the last ending processor, the transmitting processor number and the message transmitting processor corresponding to the transmitting processor number. These search processes are repeatedly carried out from the last processor to starting processor. Thus, the maximum delay path can be obtained and the performance of the parallel computer can be evaluated.

Another aspect of the invention is a performance evaluation apparatus for a parallel computer which carries out parallel processing in each processor by means of transmitting or receiving a message among a plurality of processors. This device comprises a measuring device, a memorizing device, a comparing device, a searching device and a maximum delay path obtaining device.

The measuring device measures an execution starting time, a standby starting time for reception of the message, a receiving time, a transmitting time, and an execution ending time for each processor.

The memorizing means memorizes a message number on reception of the message, a transmitting processor number, a message number on transmitting the message and each time measured by the measuring means.

The comparing means compares each execution ending time of the processors memorized by the memorizing means.

The searching means searches the processor whose execution finished last, in accordance with the output of the comparing means. The searching means also searches the standby starting time for reception of the message in the processor, the message number of the message in the processor, the transmitting processor number and the message transmitting processor corresponding to the transmitting processor number.

The maximum delay path obtaining means obtains a maximum delay path showing the longest route of message transmission by repeatedly carrying out the search processing of the searching means for each processor from the last ending processor to the starting processor where execution of the parallel processing is started.

In order to obtain the maximum delay path, the device may be provided with a barrier synchronous issuing device.

A barrier synchronous issuing device interrupts processing of the processor until all of the processors in the network issue a barrier synchronous signal with a synchronous number.

Each processor may have a synchronous circuit for issuing barrier synchronous signal with barrier synchronous number. Then the barrier synchronous issuing device interrupts processing of the processor until it detects each barrier synchronous signal with a synchronous number issued from each synchronous circuit of each processor.

The memorizing means may memorize the barrier synchronous number of each barrier synchronous signal issued by each synchronous circuit and the issuing time thereat, until the barrier synchronous issuing means detects all of the barrier synchronous issuing signals.

In this case the comparing means compares the barrier synchronous numbers and the time thereat with each other.

The searching means would then regard the processor which issued the barrier synchronous number last, as the processor having the maximum delay path, in accordance with the barrier synchronous number and the time thereat.

In addition, it is possible to obtain the waiting time interval for the message from the standby starting time for reception of the message and the message reception time, and also to obtain the waiting time interval due to the barrier synchronism. Accordingly, it is possible to understand in which path the waiting time interval is long, resulting in the ability of increasing the message transmission speed of that path in order to increase the speed of parallel processing.

The comparing means and/or the searching means may be installed in each processor in order to execute, parallely, the comparison of the execution ending time and the search of the last processor in which the execution ended.

Furthermore, a displaying means may also to show the maximum delay path visually. When the message waiting state, the starting time for reception of the message, and the number of each processor being in operation of parallel processing, are also displayed with the maximum delay path, it is possible to perform an in-depth performance evaluation for the parallel computer.

PREFERRED EMBODIMENTS OF THE PRESENT INVENTION

Preferable embodiments of the present invention will be described below.

Figure 6:
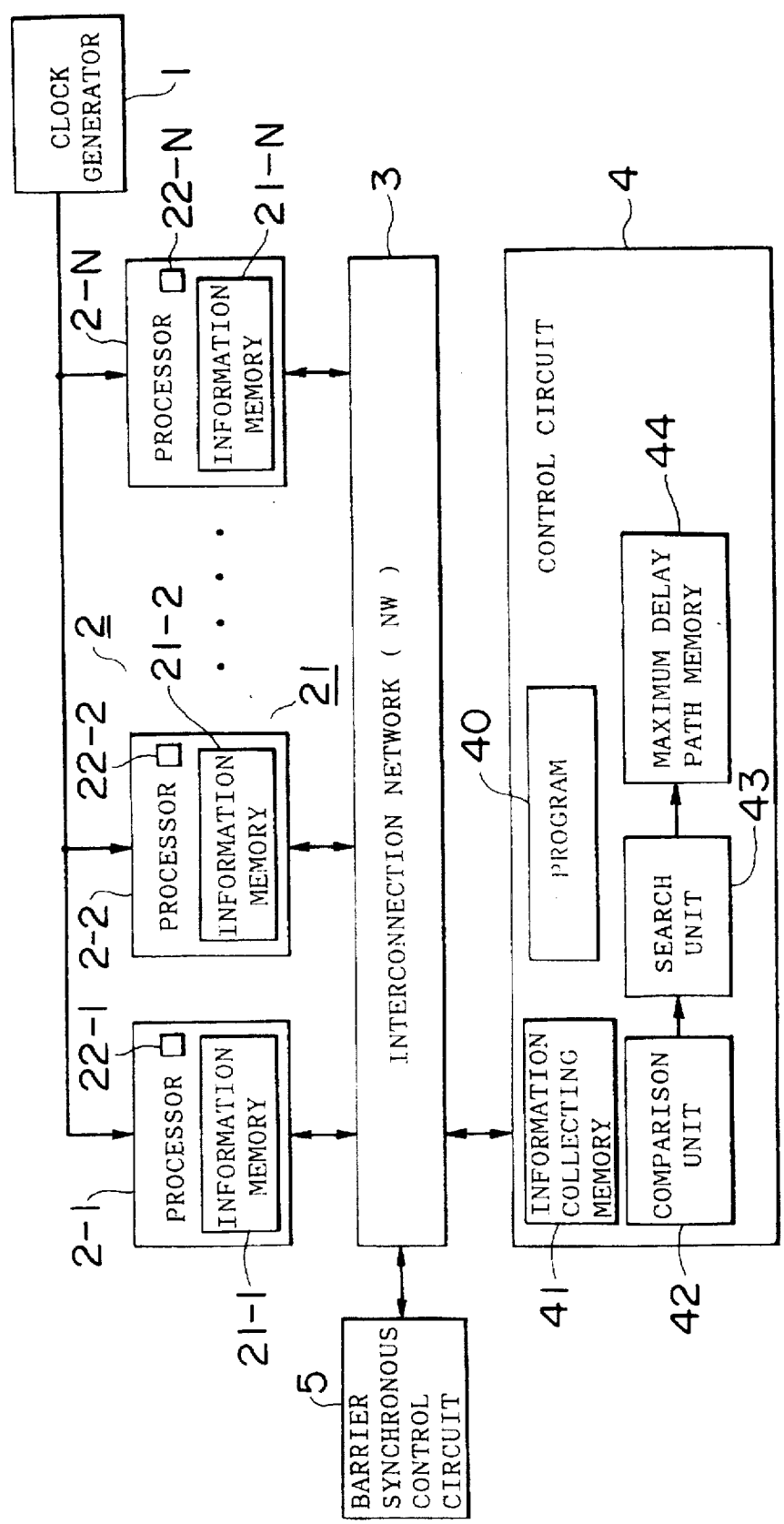
FIG. 6 shows a block diagram of a first embodiment of a performance evaluation device for use in realizing the performance evaluation method for the parallel computer according to the present invention.

FIG. 6 is a block diagram of a performance evaluation device according to the first embodiment of the present invention for use in realizing a performance evaluation method for a parallel computer according to the present invention.

A plurality of processors 2 (2-1~2-N) are installed in a parallel computer. The parallel computer carries out parallel processing in each processor 2 (2-1~2-N) by means of transmitting or receiving a message among the plurality of processors 2 (2-1~2-N).

The plurality of processor 2 (2-1~2-N) are connected to a clock generator 1. The clock generator 1 generates a clock pulse signal. The clock pulse signal is counted as a pulse number to measure an execution starting time, a standby starting time for waiting reception of a message, a message reception time, a message transmission time, and an execution ending time for every one of processors 2-1~2-N.

Each processor 2-1~2-N is connected to an interconnection network (a network NW) 3. The interconnection network 3 mutually connects each processor 2-1~2-N to allow mutual message communication among the processors 2-1~2-N.

A control circuit 4 is connected to the interconnection network 3 to signal the interconnection network 3 which processors the message communication should be made.

The processors 2-1~2-N are operated in parallel and each comprises an information memory 21 (21-1~21-N), for memorizing each piece of information, and a synchronous circuit 22 (22-1~22-N) for making and issuing barrier synchronous signal with a number in order.

In addition, the interconnection network 3 is connected to a barrier synchronous control circuit 5, which acts to interrupt the processing carried out by the processors 2-1~2-N until all synchronous circuits 22-1~22-N of the processor 2 issue the barrier synchronous signal with the synchronous number.

The memories 21-1~21-N memorize the following information sets on executing parallel processing respectively:

(1): When a message is transmitted from a transmitting processor to the other processor(s), a message number with a number in order and the time at transmission is memorized for every one message from the transmitting processor. A transmitting processor number which indicates the transmitting processor is added to the message.

(2): When a processor receives a message from the transmitting processor, the message number, the transmitting processor number and the time on reception of these numbers are memorized.

(3): When a processor waits for reception of a message from the transmitting processor, the starting time for waiting is memorized. This is also referred to as the "standby starting time". After the standby starting time, the processor can receive a message from another processor at any time.

(4): When the execution of the parallel processing is started, the time the execution is started is memorized.

(5): When the execution of the parallel processing is ended, the time the execution is ended is memorized.

(6): When the barrier synchronous signal is issued from the barrier synchronous circuit 22 (22-1~22-N), the barrier synchronous number in the order at every time when the barrier synchronous signal is issued and the time at the barrier synchronous signal is issued are memorized. The barrier synchronous control circuit 5 makes the execution of the processor wait until all of the processors issue the barrier synchronous signal.

The control circuit 4 controls the above mentioned interconnection network 3. The control circuit 4 includes a program 40, an information collecting memory 41, a comparison unit 42, a search unit 43 and a maximum delay path memory 44 to obtain a maximum delay path.

The information collecting memory 41 memorizes the information indicating the message number, the transmitting processor number, the time or the like collected from the information memories 21-1~21-N in each processor 2-1~2-N through the interconnection network 3.

The information collecting memory 41 memorizes the barrier synchronous number and the time the barrier synchronous signal is issued.

The control circuit 4 is also implemented to obtain, after ending the execution of the parallel processing is ended, the maximum delay path for indicating in which processor 2 the maximum delay path is caused in accordance with each piece of information memorized in the information memorized in the information collecting memory 41.

The comparison unit 42 compares the execution ending time or other time information with each other as well as comparing the issue time for each barrier synchronous number, which is memorized in the information collecting memory 41, to supply a comparison output to a search unit 43.

The search unit 43 searches the processor 2 whose execution has lastly been ended, the standby starting time for reception of the message in this processor, the message number of this processor, the transmitting processor number, and the message transmitting processor corresponding to the transmitting processor number in response to the output of the comparison circuit 42. In addition, the search unit 43 may search the processor 2 which has lastly issued the barrier synchronous signal in response to the comparison result for issue time for each synchronous number. The processor 2 which has lastly issued the barrier synchronous signal is regarded as the processor in which the execution has lastly been ended.

A maximum delay path memory 44 stores in time sequence each piece of information searched by the search unit 43, namely, the maximum delay path.

A program 40 carries out the maximum delay path obtaining step in FIG. 5 described hereinafter. The program 40 uses the information collecting memory 41, the comparison unit 42, the search unit 43 and the maximum delay path memory 44.

Next, the first embodiment of the performance evaluating method for a parallel computer according to the present invention will be described with reference to FIGS. 4 and 5.

Figure 4:
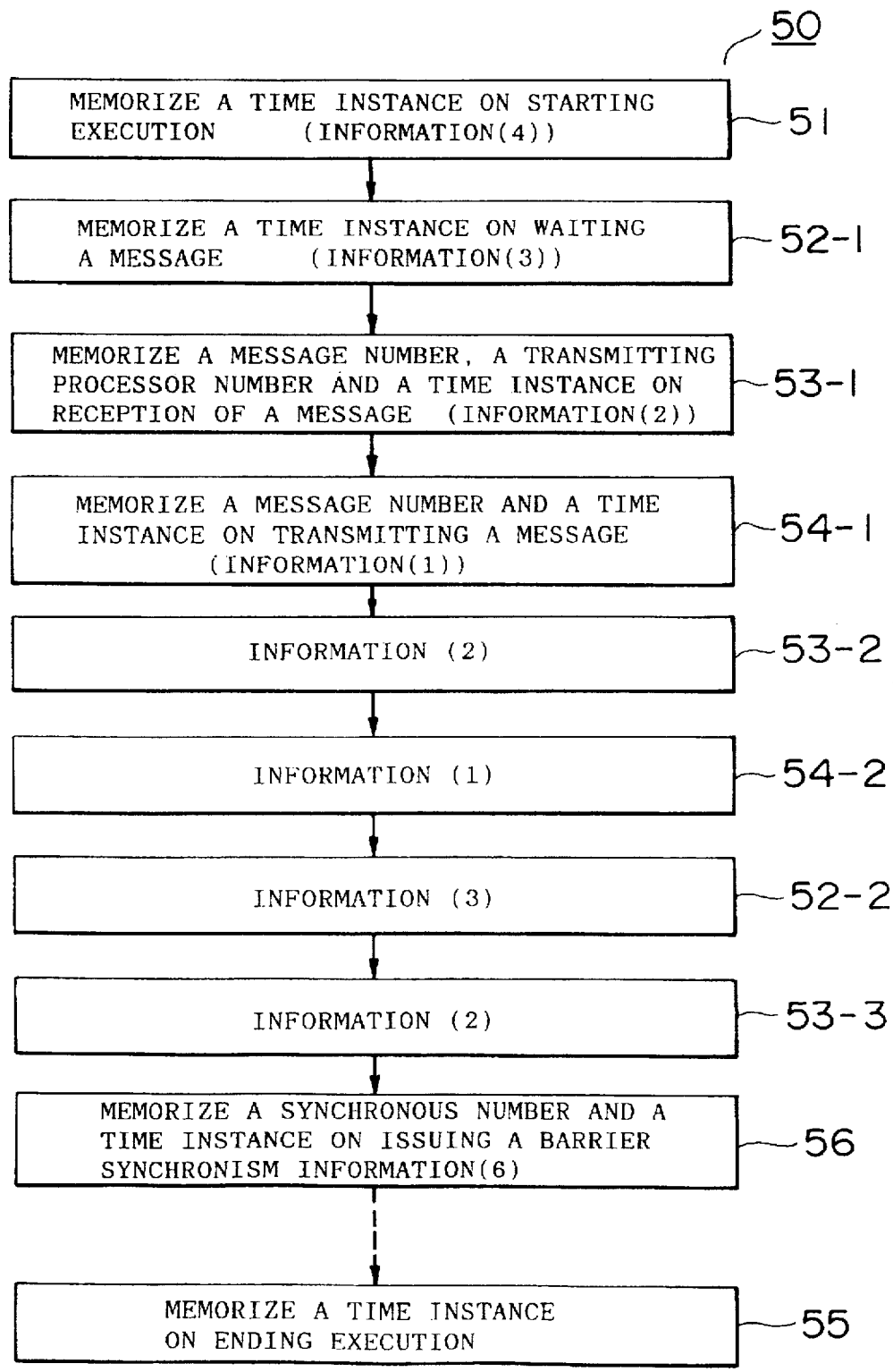
FIG. 4 shows a flow chart of a memorizing step for memorizing each piece of information.

FIG. 4 shows a flow chart for memorizing the information set forth above. First in step 51 each information memory 21-1~21-N of the processor 2-1~2-N, in parallel processing, the execution starting time measured by the clock generator 1 is memorized (memorization of the information set (4)). The standby starting time reception of the message is then memorized (memorization of the information set (3) in step 52-1. Thereafter, in step 53-1, the message number on reception of the message, the transmitting processor number and the reception time thereof are memorized (memorization of the information set (2)).

Then, in step 54-1 the message number on transmitting the message is memorized (memorization of the information set (1). Similarly, step 53-2, step 54-2, step 52-2 and step 53-3 memorize the information set (2), the information set (1), the information set (3) and the information set (2), respectively.

In addition, when the barrier synchronous signals are issued at different times from the synchronous circuits 22-1~22-N in each processor 2-1~2-N, each information memory 21-1~21-N memorizes the synchronous number and the time thereat on issuing the barrier synchronous signal in step 56. Further, when a barrier synchronous control circuit 5 confirms that the barrier synchronous signal has been issued from all of the synchronous circuits 21-1~21-N, the processing carried out by the processor is restarted.

Finally, in step 55, the time at the execution is ended is stored in the information memory.

Thus, each information memory 21-1~21-N memorizes the information sets in the following order: (3), (2), (1), (2), (1), (3), (2), (6) and finally, (5) on ending the execution of the parallel processing. Information set (3) is always followed by information set (2) because the message is bound to be received after being ready for reception of the message.

Figure 5:
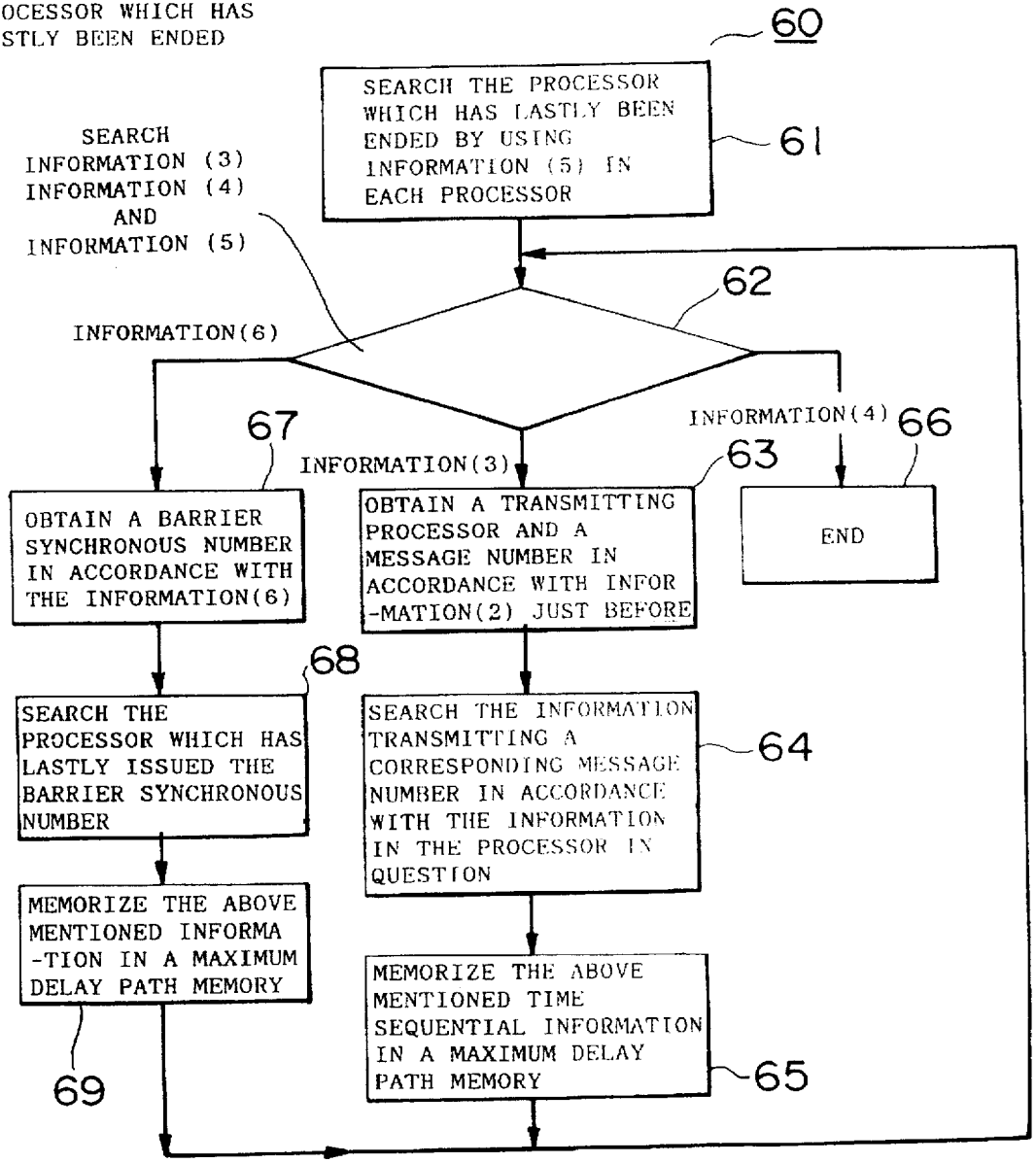
FIG. 5 shows a flow chart of the maximum delay path obtaining step.

FIG. 5 shows a flow chart for the maximum delay path obtaining step 60.

After ending the execution of the parallel processing, each piece of information memorized in each information memory 21-1~21-N is collected in the information collecting memory 41 through the interconnection network 3. In accordance with each information supplied from the information collecting memory 41, the maximum delay path is obtained. In general, data is sequentially read in reverse order, from the information set (5), to analyze it.

More particularly, the comparison unit 42 compares the execution ending time as stored in the information set (5) of each processor 2-1~2-N with each other. First, in step 61, the search unit 43 obtains the identity of the processor in which the execution of the parallel processing has lastly been ended. For example, processor A.

Next, the information stored in the memory of the last ended processor (for example, the processor A) is read, in reverse order, to search, in step 62, the information such as the standby starting time for waiting reception of the message in information set (3) or the barrier synchronous signal in information set (6) (step 62).

When the standby starting time for waiting reception of the message is searched in the information set (3), the transmitting processor number and the message number are searched, in accordance with the message reception number of the like, in the prior information set (2) in step 63.

The information transmitting the corresponding message number is searched among the information of the processor in question in step 64. These pieces of information are stored in the maximum delay path memory 44 in step 65.

Further, it is possible to obtain the maximum delay path in accordance with each piece of information memorized in the maximum delay path memory 44 by means of repeating steps 62-65 regarding each processor from the last ending processor to the starting processor where execution of the parallel processing is started.

For example, with the processors A, B, and C, a message transmission sequence would be:

(1) The processor A starts the execution.

(2) The processor A is ready to receive a message from the processor B.

(3) The processor B transmits the message.

(4) The processor B starts the execution.

(5) The processor B is ready to receive a message from the processor C.

(6) The processor C transmits the message.

(7) The processor C starts the execution.

(8) The execution of the processor B is ended.

Each piece of information includes the information about time so that the time interval between step (2) and step (3) and the time interval between step (5) and step (6) can be obtained. Thus, it is possible to know the message reception waiting time interval.

Therefore, the performance of the parallel computer can be evaluated. In addition, the waiting time interval for the message can be obtained so that it is possible to identify the path in which the waiting time interval is the longest, and increasing the message transmission speed of that path in order to increase the speed of parallel processing.

On the other hand, when the information set (6) is searched, the barrier synchronous number is obtained. The comparison unit 42 compares the times when the barrier synchronous signal are issued. Then, the search unit 43 searches the processor which has lastly issued the barrier synchronous number (in step 68). The information is stored in the maximum delay path memory 44 (in step 69).

Further, the processing at step 67~69 for the processor is repeated regarding each processor from the last ending processor to the starting processor where execution or the parallel processing is started, to obtain the maximum delay path in accordance with each piece of information memorized in the maximum delay path memory 44.

Therefore, in addition, it is possible to obtain the waiting time interval for the barrier synchronous signal so that it is possible to identify which path has the longest the waiting time interval, for increasing the barrier synchronous demand of that path.

Figure 7:
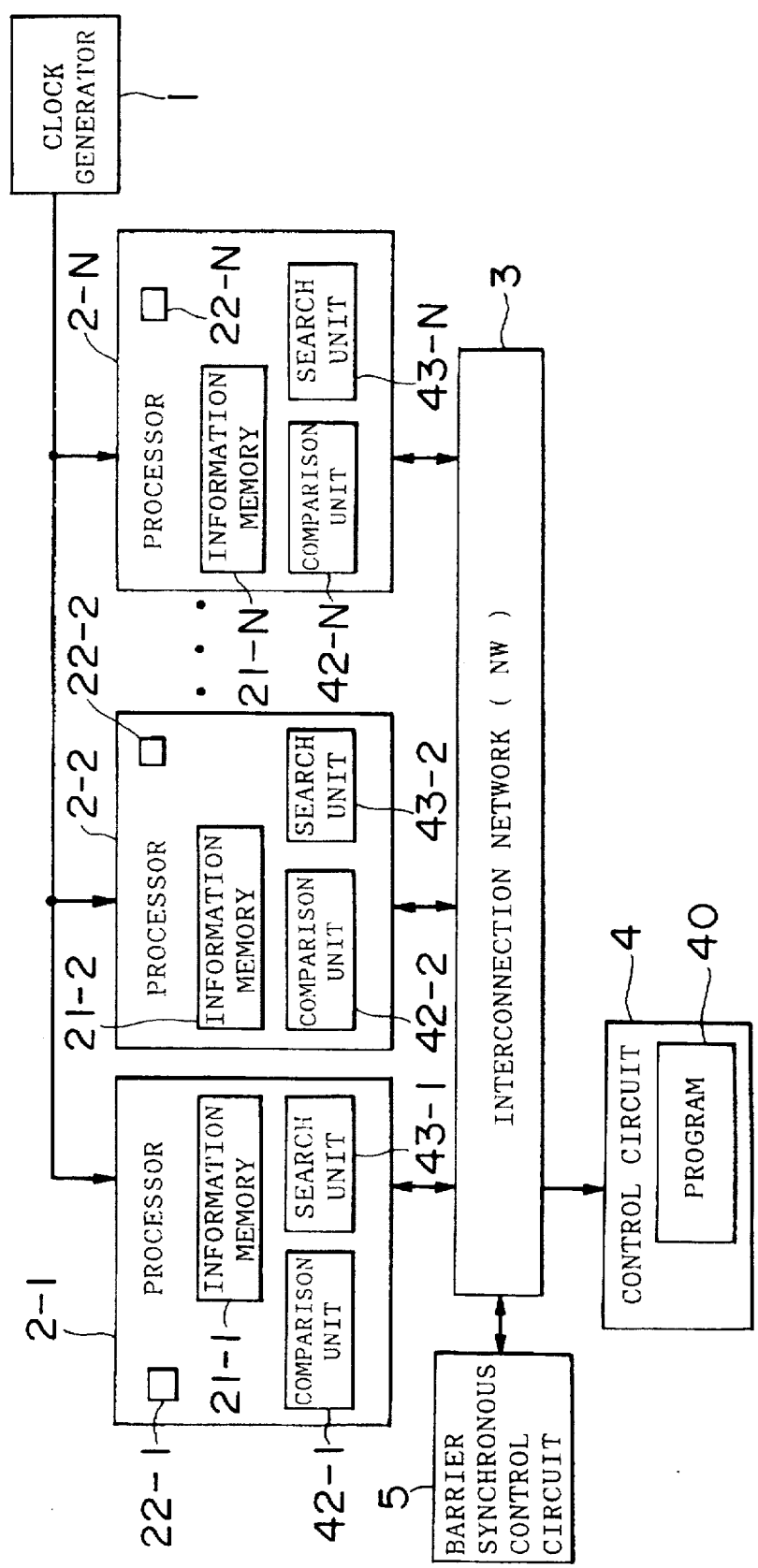
FIG. 7 shows a block diagram of a second embodiment of the performance evaluation device.

Next, FIG. 7 is a block diagram of a second embodiment FIG. 7 is a structural block diagram of a second embodiment] of the performance evaluation device for the parallel computer.

The processors 2 (2-1~2-N) are connected to a clock generator 1 and further connected to an interconnection network (a network NW) 3. Each processor 2-12~2-N has the information memories 21-1~21-N, the comparison units 42-1~41-N, the search units 43-1~43-N, and the synchronous circuits 22-1~22-N, respectively, and the control circuit 4 which comprises the program 40.

In accordance with such structure, in each processor 2-1~2-N, the comparison units 42-1~42-N carry out comparison processing in parallel for comparing each time or each barrier synchronous number. The search units 43-1~43-3 carry out the above mentioned searching processing in parallel. Thus, the'maximum delay path can be obtained.

That is, each information memory 21-1~21-N of each processor 2-1~2-N memorizes time information such as execution starting time for parallel processing and standby starting time for waiting reception of the message. Then, according to control, based on the program 40, the comparison unit 42-1 is activated to compare each execution ending time in the information memory 21-1 and 21-2. Where the execution ending time in the information memory 21-1 is later than that of 21-1, the comparison unit 42-1 of the processor 2-1 having the information memory 21-1 is activated again compare each execution ending time in the information memory 21-1 and the next information memory 21-3. This processing is repeated until latest execution ending time is detected. At last, the comparison unit 42-N in the processor 2-N having the information memory 21-N which is memorizing the latest execution ending time is activated. The processor 2-N including the comparison unit 42-N is regarded as a processor 2-N in which the execution has lastly been completed.

Thereafter, the search unit 43-N in the processor 2, which the execution has lastly been ended, searches the standby starting time for waiting reception of the message in that processor, the message number of this processor, the transmitting processor number, and the message transmitting processor corresponding to the transmitting processor number. Then the search unit 43-N in the transmitting processor 2, searches the standby starting time for waiting reception of the message in the processor and another information as well as the above search processing. This search processing is repeated until it is conducted in a starting processor where execution of the parallel processing was started the maximum delay path is obtained from the route of the search processing.

In addition, when the search unit 43 detects the last issued barrier synchronous signal, the search unit 43 can also regard the processor 2, where the barrier synchronous signal has been issued, as the processor having the maximum delay path.

As described above, in the second embodiment, the maximum delay path can be obtained in a processor. Therefore, an external memory such as information collecting memory 41 as in the first embodiment, is not needed.

Next, the third embodiment of the present invention will be described with reference to the drawing.

Figure 8:
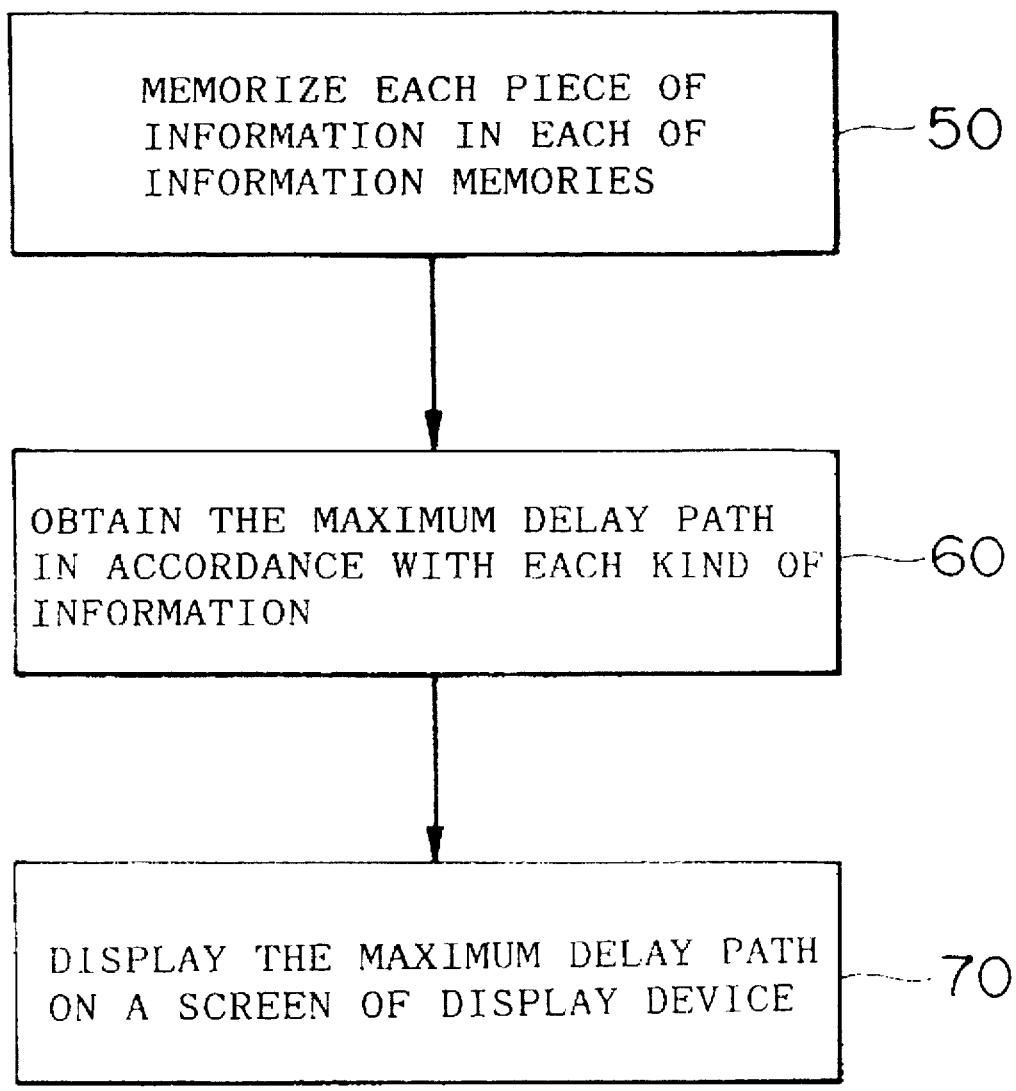
FIG. 8 shows a flow chart for displaying the maximum delay path of the third embodiment.
Figure 9:
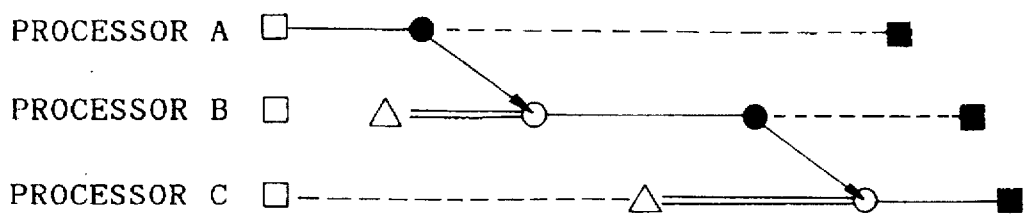
FIG. 9 shows a view for illustrating a first example of a method for displaying the maximum delay path.
Figure 10:
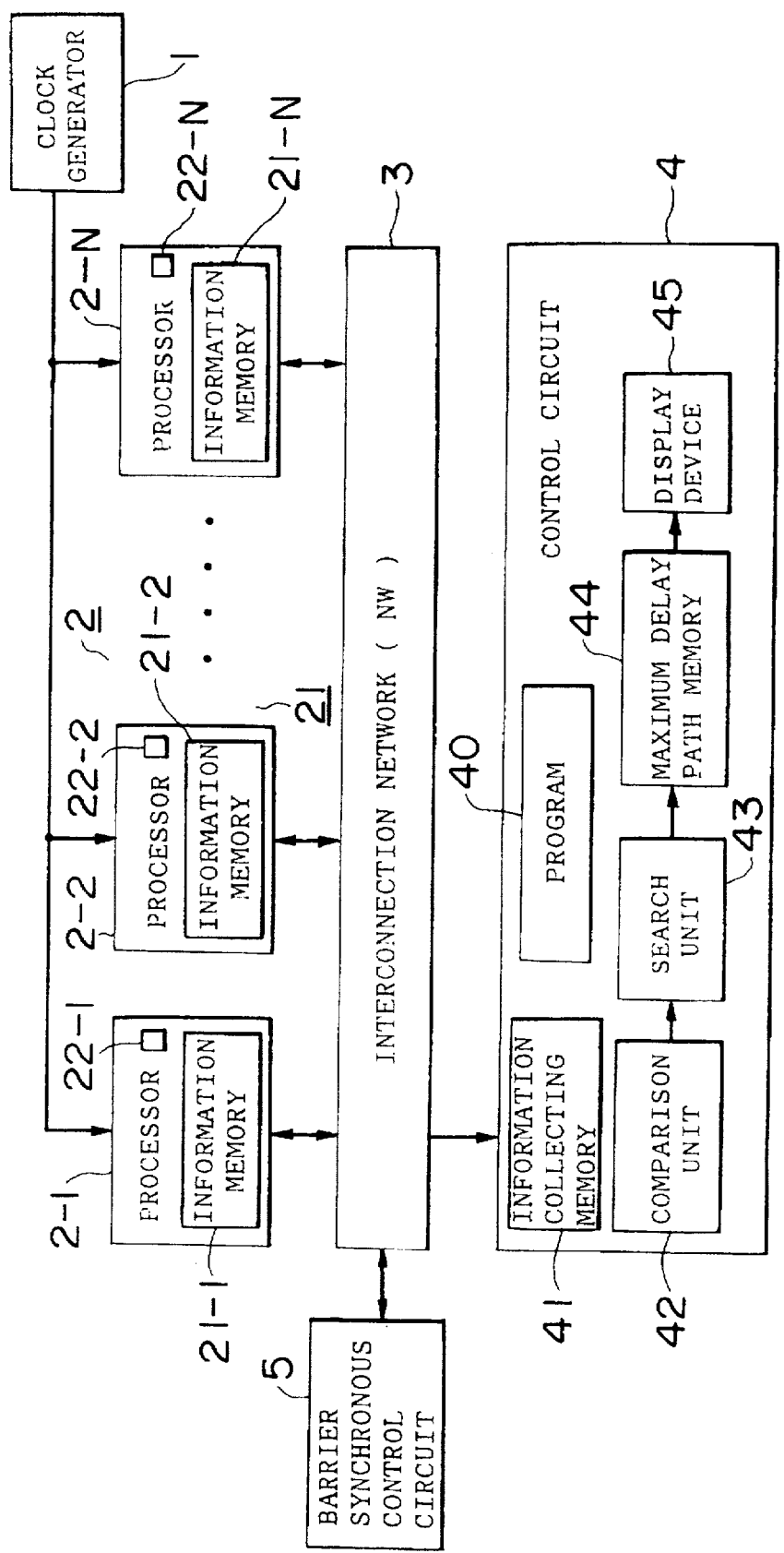
FIG. 10 shows a block diagram of a third embodiment of the performance evaluation device.

FIG. 10 shows a block diagram of a third embodiment of the performance evaluation device for the parallel computer in accordance with a third embodiment. FIG. 8 is a flow chart for displaying the maximum delay path in the third embodiment. FIG. 9 is a view showing an example of a method for displaying the maximum delay path.

Figure 1:
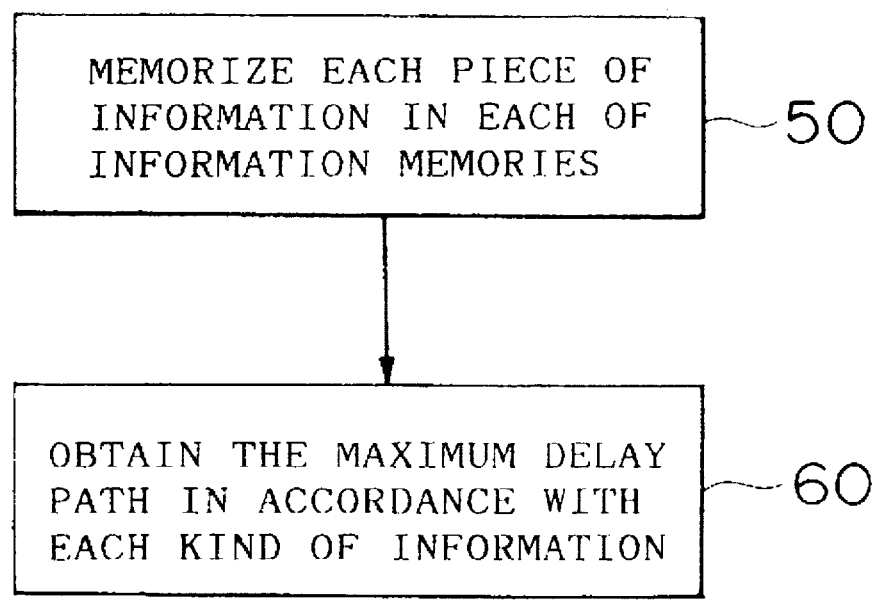
FIG. 1 shows a flow chart of a performance evaluation method for a parallel computer according to the present invention.
Figure 2:
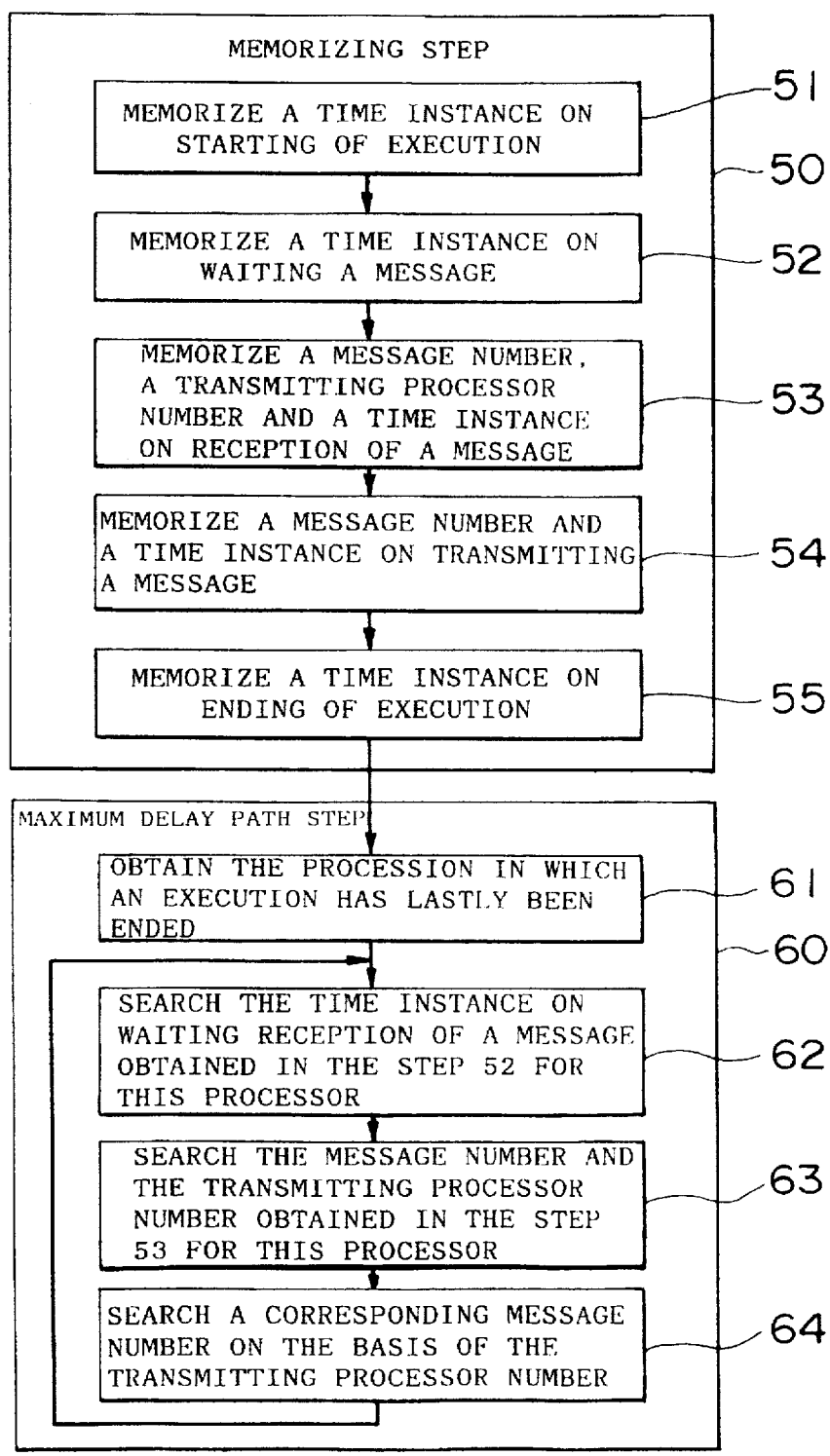
FIG. 2 shows a detailed flow chart of a performance evaluation method for a parallel computer according to the present invention.
Figure 3:
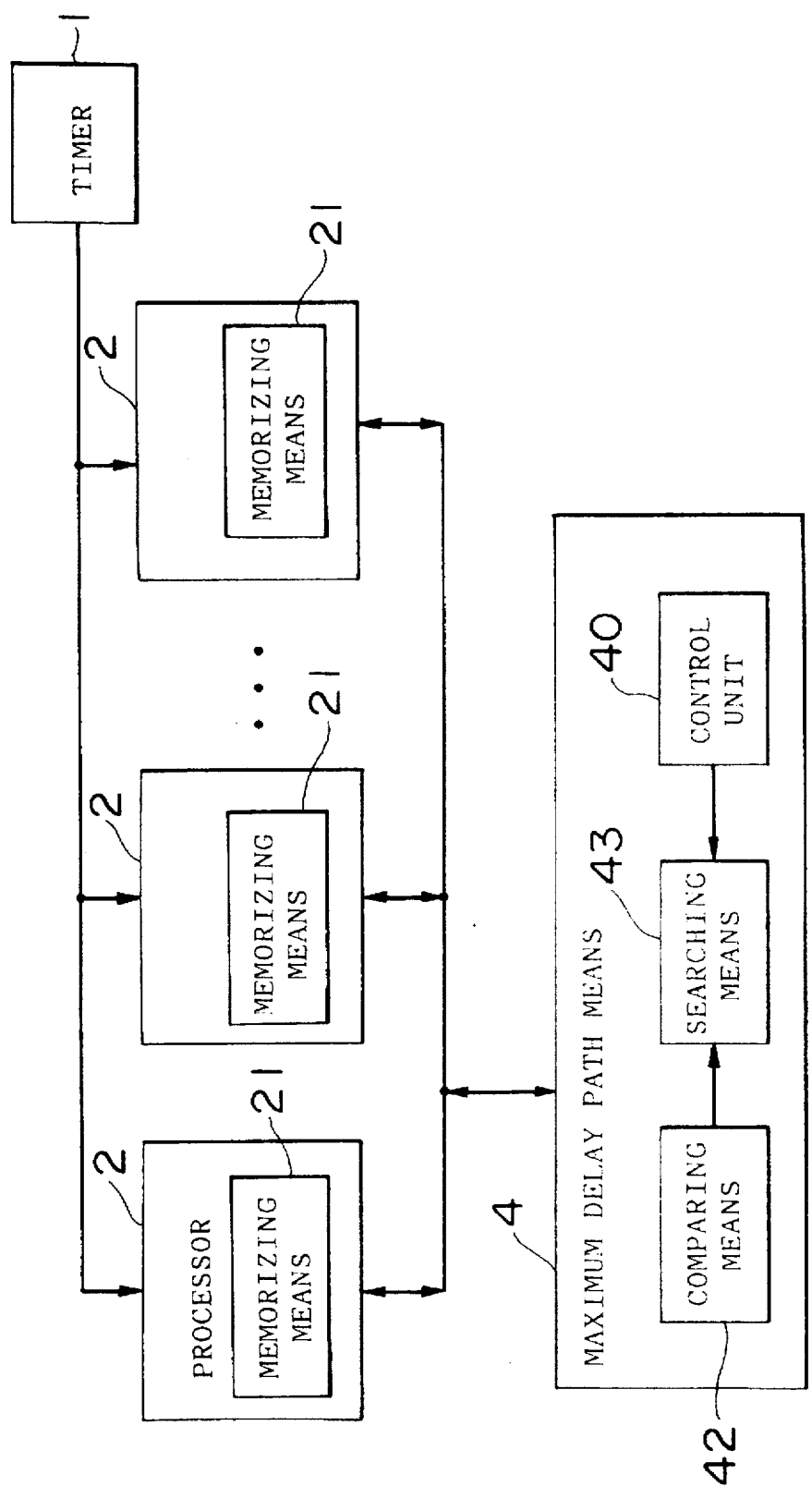
FIG. 3 shows a block diagram of a performance evaluation device for a parallel computer according to the present invention.

A display device 45 is provided the structure illustrated in FIG. 3, for displaying the maximum delay path memorized in the maximum delay path memory 44 on a screen. However, it will be recognized that a printer may also be used and any other display devices is applicable which enables visually displaying the maximum delay path.

In addition, the performance evaluation method for the parallel computer which displays the maximum delay path comprises, as illustrated in FIG. 8, the above mentioned memorizing step 50, the maximum delay path obtained step 60 and a step 70 for displaying the maximum delay path obtained at the maximum delay obtaining step 60.

By way of example, the following message transmission sequence is used:

(1) The processor A starts the execution.

(2) The processor A transmits a message to the processor B.

(3) The processor B is ready to receive the message from the processor A.

(4) The processor B receives the message from the processor A.

(5) The processor B transmits the message to the processor C.

(6) The processor C is ready to receive a message from the processor B.

(7) The processor C receives the message from the processor B.

(8) The execution of the processor C is ended.

FIG. 9 shows a sample display of the maximum delay path in accordance with the third embodiment. In FIG. 9, an abscissa and an ordinate on display represent the time and the type of the processor, respectively. Further, a black square represents termination of the execution and a black circle represents transmission of the message or a barrier synchronous demand. Additionally, a white circle represents reception of the message or an establishment of the barrier synchronism, and a triangle represents a reception wait for the message or the barrier synchronous demand. A white square represents start of the execution. A double line represents a reception waiting state for the message and a single line represents the maximum delay path. A dotted line represents execution of one besides the maximum delay path and an arrow represents the message flow of the maximum delay path.

As set forth above, the maximum delay path is displayed on the display device 45 so that which processor is awaiting a message from which processor is shown. In addition, the display device 45 also displays the waiting state for the message so that it is possible to identify the message waiting time interval which is causing the deterioration of performance.

In accordance with the third embodiment, it is possible to visually identify the processor in which the message waiting time is long. For example, in the case illustrated in FIG. 9, the processor C has been awaiting the message from the processor B for the longest time and the message transmission speed from the processor B should be increased.

Figure 11:
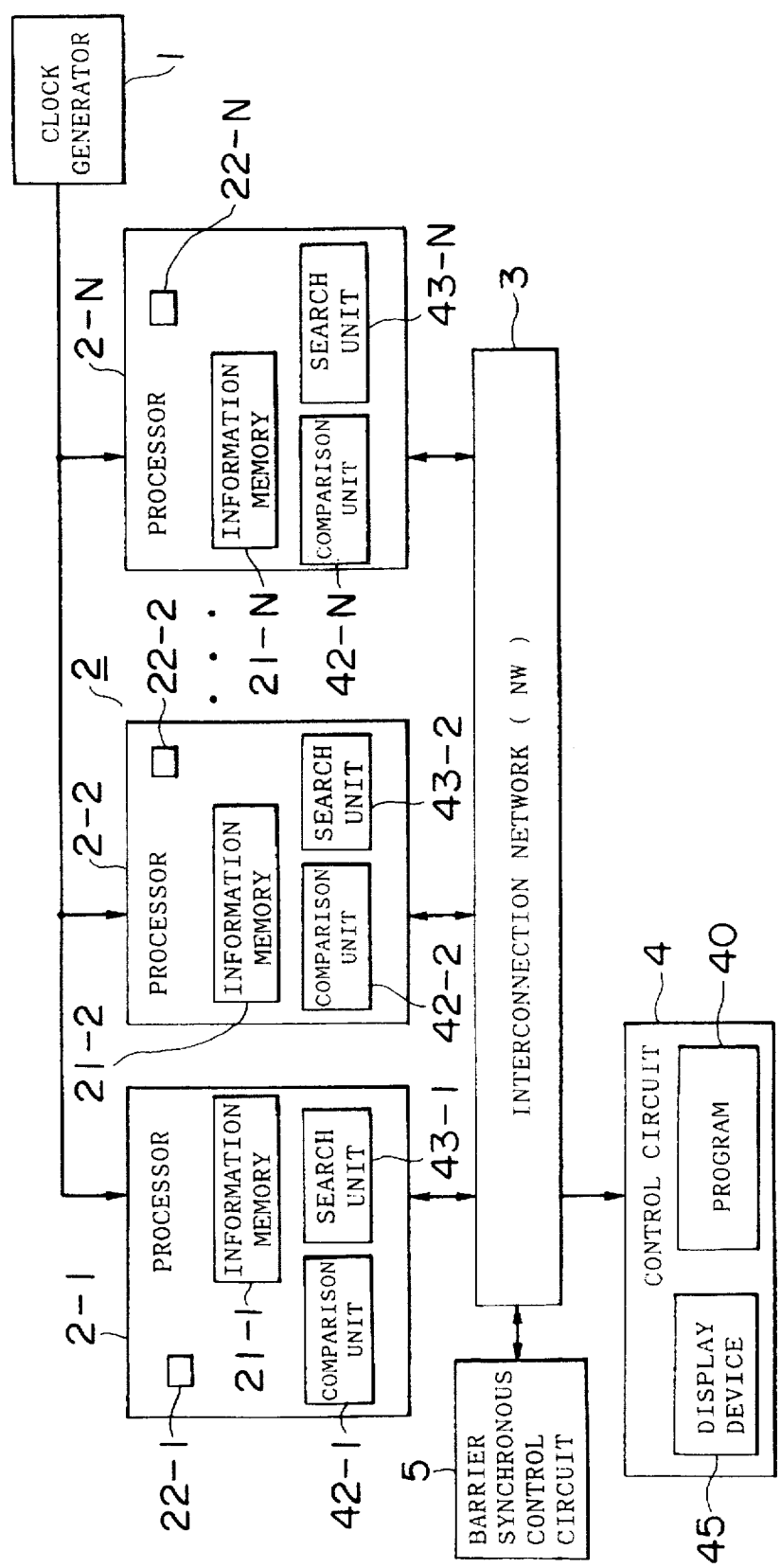
FIG. 11 shows a block diagram of a fourth embodiment of the performance evaluation device.

FIG. 11 is a block diagram showing a fourth embodiment of the performance evaluating device for the parallel computer.

In general, a display device 45 is added to the above mentioned second embodiment to display the maximum delay path on a screen of the display device 45.

Such a fourth embodiment exhibits the results of the second embodiment and the results of the third embodiment.

Figure 12:
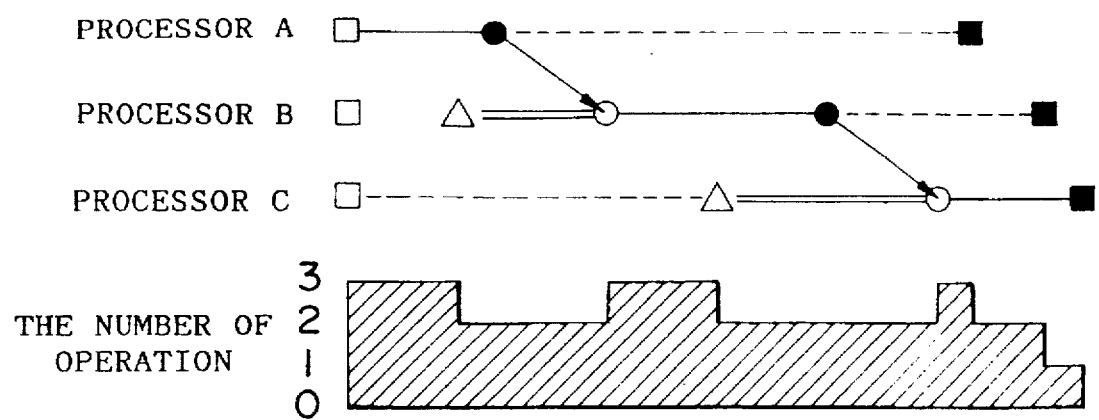
FIG. 12 shows a view for illustrating a second embodiment of a method for displaying the maximum delay path.

FIG. 12 is a view showing a second method for displaying the maximum delay path in accordance with the third embodiment.

As shown in FIG. 12, the display device 45 also displays the number of each processor in operation when displaying the maximum delay processor on the screen.

Figure 13:
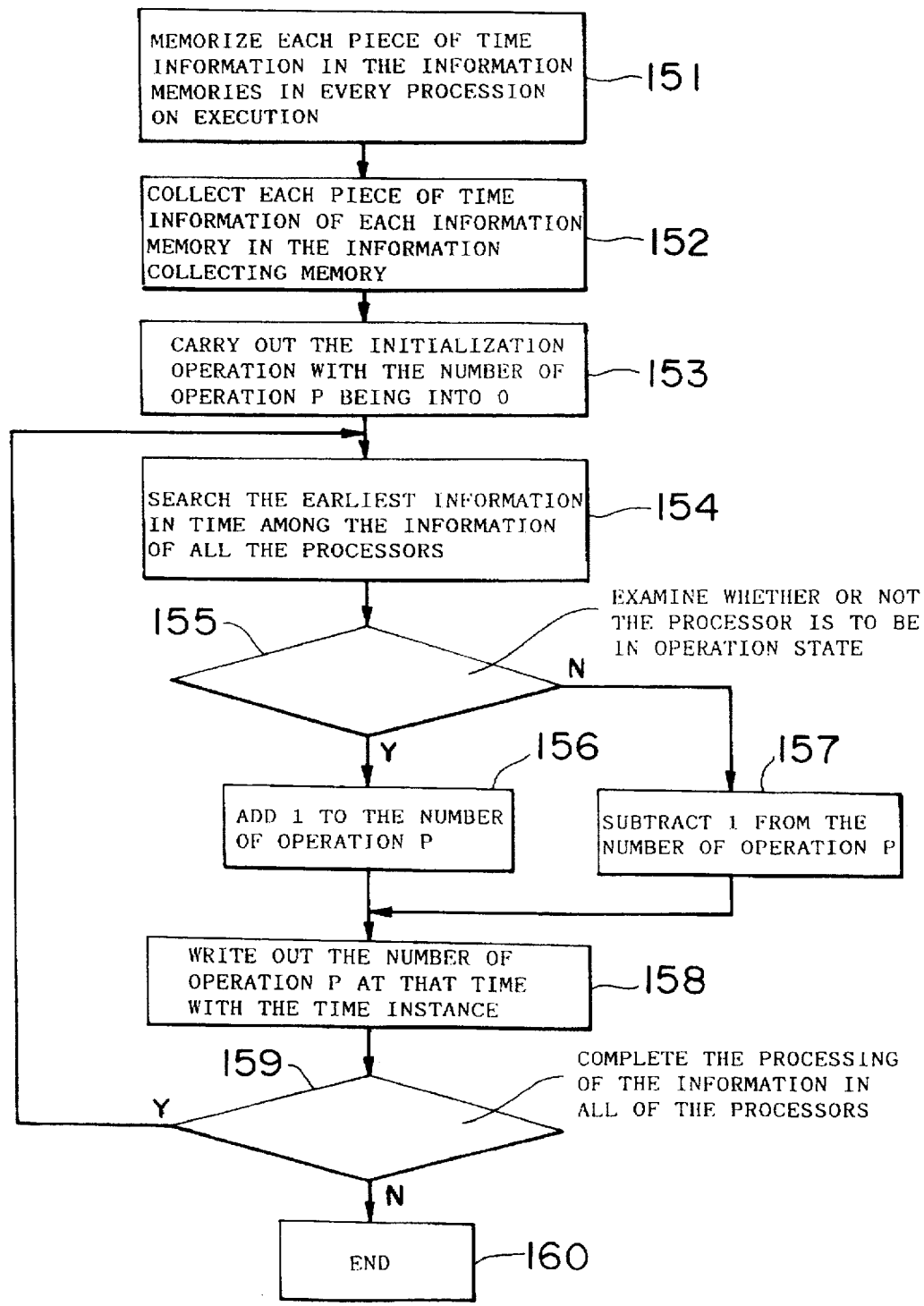
FIG. 13 shows a flow chart of a performance evaluation method for a parallel computer.

FIG. 13 is a flow chart showing a method for obtaining the number of each processor 2 in operation In step 151, each processor 2 memorizes the message transmission starting time and the transmission ending time, the message reception starting time and the reception ending time, an interruption processing starting time and process ending time, a time for a task switch, and the processing starting time and the processing ending time. The operating state is understood from the processing starting time to the processing ending time. Each item of time information is collected to a separate memory in step 152.

Next, the initialization operation is carried out with the number of operation being zero in step 153. Thereafter in step 154, earliest information in time is searched out amount the information of all of the processors 2-1~2-N. Then, whether or not the processor is to be in operation state is determined in step 154.

If the processor is not in the operation state, the number of operation is decreased by one in step 157. If the processor is in the operation state, the number of operation is increased by one in step 156. Thereafter, in step 158, the number of operation at that time is written out with the time instance.

Next, whether or not the processing of the information in all of the processors has been completed is determined in step 159. If completed, the process returns to the step 154 and the above mentioned process is repeated.

By means of processing in a manner described above, the change of the number of the operation in time sequence, as illustrated in FIG. 12, is obtained to determine at which time the operational rate is reduced. Thus, the cause of deterioration of performance in the parallel computer can be recognized, as compared with a display illustrated in FIG. 9.

Figure 14:
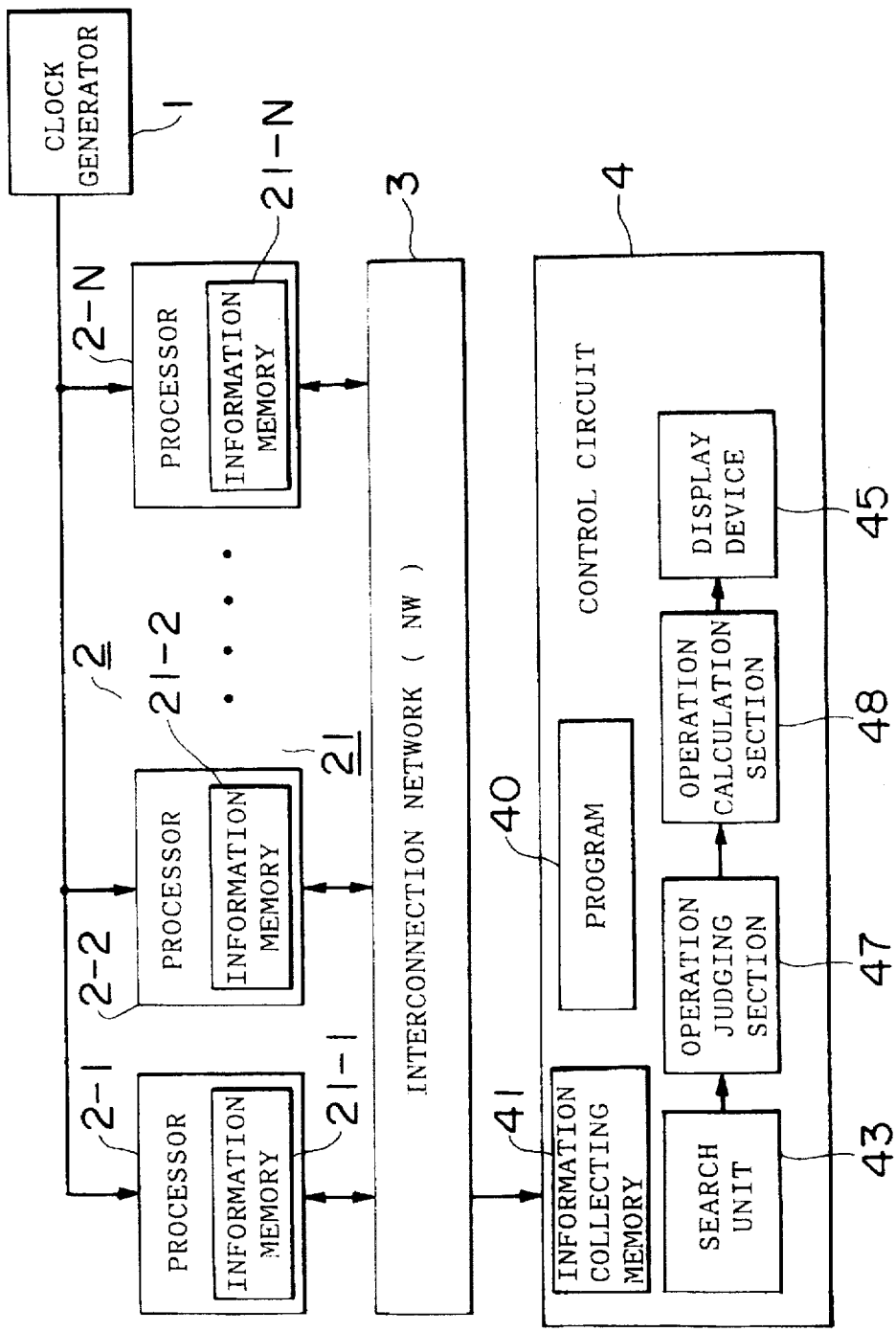
FIG. 14 shows a block diagram of a fifth embodiment of the performance evaluation device.

FIG. 14 is a block diagram showing the fifth embodiment for a performance evaluation device for use in realizing a performance evaluation method for a parallel computer. The clock generator 1 memorizes in each processors 2-1~2-N, the message transmission starting time and the transmission ending time, the message reception starting time and the reception ending time instance, an interruption processing starting time and process ending time, a time for a task switch, and the processing starting time and the processing ending time.

Each information memory 21-1~21-N memorizes the following information sets when the parallel computer is executed:

(11): the message transmission starting time,
(12): the transmission ending time,
(13): the message reception starting time,
(14): the reception ending time instance,
(15): an interruption processing starting time,
(16): an interruption processing ending time,
(17): a time for a task switch,
(18): the processing starting time,
(19): the processing ending time.

Whether the processor is operated in application tasks is as follows:

In the following description, message transmission time is the time from Information set 11 to Information set 12. The message reception time is the time from Information set 13 to Information set 14. The interruption time is the time from Information set 15 to Information set 16. Tasks, except applications such as in nil task, are executed in the time. Information sets 18 and 19, which exemplify the above times, are the operation state. The operation numbers P of the processors 2 is obtained from the information sets. The numbers of processors is N.

The information collecting memory 41 memorizes each time collected from the information memories 21-1~21-N in each processor 2-1~2-N through the interconnection network 3.

A control circuit 4 is constructed as follows:

A search unit 43 searches the lastly ended time information among the time informations and outputs a result to an operation judging section 47.

The operation judging section 47 determines whether each processor 2 is in operation state based on each time informations search by the search unit 43 and outputs the results to an operation calculation section 48.

The operation calculation section 48 obtains the operation numbers of the processors at random times by using the output the of the operation judging section 47 and outputs to a display device 45.

A display device 45 outputs time change from the operation calculation section 48 to each processor 2 and records changes of the operation in time sequence in the axis of abscissa and the numbers of the operation in the axis of the spindle, as shown in FIG. 12.

A program 40 operates in accordance with the flow chart illustrated in FIG. 13. The instruction is supplied to the information collecting memory 41.

When the device is operated in accordance with the steps shown in FIG. 13, it is possible to obtain the changes of the operation in time sequence, as shown in FIG. 12, and to recognize when the operation rate is reduced. Therefore, a cause of deterioration of performance in the parallel computer can further be recognized so that problems of the program can be seen in advance.

Figure 15:
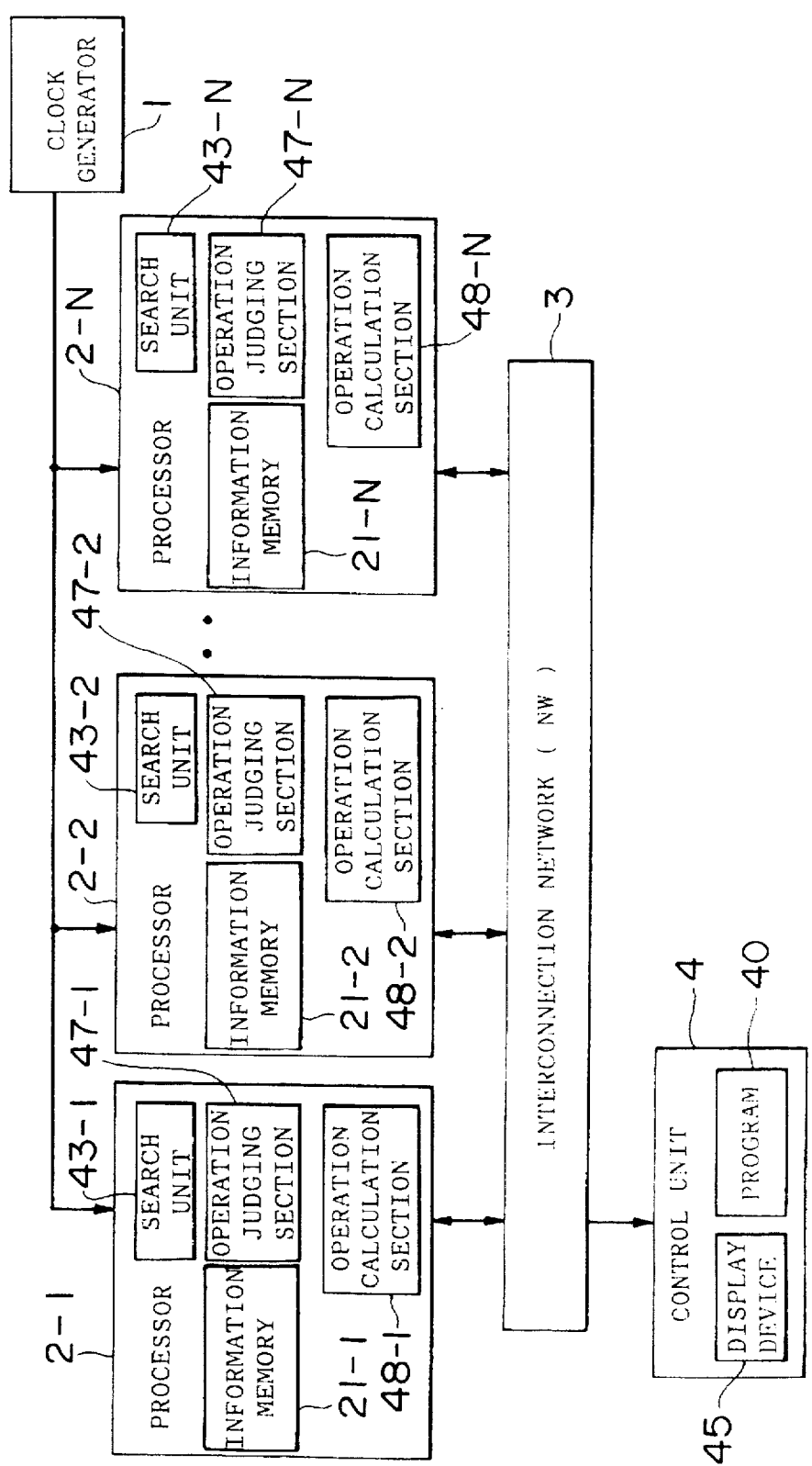
FIG. 15 shows a block diagram of a sixth embodiment of the performance evaluation device.

FIG. 15 is a block diagram showing the sixth embodiment for a performance evaluation device for use in realizing a performance evaluation method for a parallel computer. The device of sixth embodiment includes information memories 21-1~21-N, search units 42-1~42-N, operation judging section 43-1~43-N and the operation number calculation section 44-1~44-N in each processor 2-1~2-N. A control circuit 4 includes a program 40 and a display device 45.

In the sixth embodiment, the processing is conducted in parallel in each processor 2-1~2-N and the numbers of the operation can be obtained. According to the present invention, it is possible to obtain the maximum delay path on message communication or on barrier synchronous issue, thereby to evaluate the performance of a parallel computer. In addition, it is possible to obtain the waiting time for the message and the waiting time due to the barrier synchronism, thereby to identify in which path the waiting time is long.

Further, the maximum delay path is displayed so that it is visually shown. By means of displaying the message waiting state and the number of operated processor on displaying the maximum delay path, the performance evaluation of the parallel computer can be improved.

What is claimed:

1. A performance evaluation method for a parallel computer for carrying out parallel processing in each processor by transmitting or receiving a message among a plurality of processors, comprising the steps of:

memorizing step for memorizing various pieces of information in each processor in the parallel processing, said step includes memorizing the steps of:
(1) a step for memorizing execution starting time of the parallel processing;
(2) a step for memorizing a standby starting time for reception of the message when a standby starting time has been identified;
(3) a step for memorizing a message number on reception of said message, transmitting processor number and the time thereat;
(4) a step for memorizing a message number on transmitting the message, and the time thereat; and
(5) a step for memorizing execution ending time; and maximum delay path obtaining step for obtaining, after execution of said parallel processing is completed, a maximum delay path showing a longest message transmitting route in accordance with the various pieces of information;

said maximum delay path obtaining step includes the steps of:
(a) a step for identifying the last ending processor in which the execution has lastly been completed in accordance with each time obtained in said step for memorizing execution ending time in each processor;
(b) a step for identifying the standby starting time for reception of the message obtained in said step (2) in an identified processor to obtain a waiting time interval;
(c) a step for identifying the message number and the transmitting processor number obtained in step (3) in the identified processor to obtain the longest message transmitting route; and
(d) a step for identifying a message transmitting processor corresponding to the transmitting processor number to obtain the longest message transmitting route;

said steps (b) through (d) are repeated regarding each processor from the last ending processor to starting processor where execution of the parallel processing is started, to obtain said maximum delay path.

2. A performance evaluation method for a parallel computer according to claim 1, wherein said maximum delay path obtaining step obtains the waiting time interval for a message in accordance with the time obtained in said step (b) and the time obtained in said step (c).

3. A performance evaluation method for a parallel computer according to claim 1, wherein in the case where processing carried out by the processors is interrupted until said all of the processors issue a barrier synchronous signal with a synchronous number on execution of said parallel processing, said memorizing step further includes a step (6) for memorizing barrier synchronous number of said barrier synchronous signal and the time thereat:

said maximum delay path obtaining step further including a step (e) for identifying a processor which has lastly issued the barrier synchronous number and the time thereat obtained in said step (6) to obtain said maximum delay path.

4. A performance evaluation method for a parallel computer according to claim 3, wherein said maximum delay path obtaining step obtains a waiting time interval due to the barrier synchronous control in accordance with the time obtained in said step (e).

5. A performance evaluation method for a parallel computer according to claim 3, wherein said maximum delay path obtaining step further including a step (f) for displaying said obtained maximum delay path.

6. A performance evaluation method for a parallel computer according to claim 1, wherein said maximum delay path obtaining step further including a step (f) for displaying said obtained maximum delay path.

7. A performance evaluation method for a parallel computer according to claim 6, wherein said maximum delay path and message flow of the path are displayed with one axis on a display representing the time and the other axis thereon representing processors for displaying said maximum delay path.

8. A performance evaluation method for a parallel computer according to claim 6, wherein a waiting sate for said message is also displayed in said step (f) on displaying said maximum delay path.

9. A performance evaluation method for a parallel computer according to claim 6, wherein the number of said each processor being in operation is also displayed in said step (f) on displaying said maximum delay path.

10. A performance evaluation device for a parallel computer having a plurality of processors for executing parallel processing in each processor by transmitting a message from a starting processor and receiving and transmitting a message among a plurality of processors, comprising:

measuring means for measuring in each processor an execution starting time indicating when execution is started, a standby starting time for the reception of the message when a standby starting time has been identified, a receiving time indicating when the message was received, a transmitting time indicating when the message was transmitted, and an execution ending time indicating when execution stopped;

memorizing means for storing a message number of the message on reception of the message, a transmitting processor number that sent the message, a message number of the message on transmitting the message and each time measured by the measuring means;

comparing means for comparing the execution ending time of each processor;

searching means for identifying a last processor in which execution finished last based on the output of the comparing means, and for identifying a longest route of message transmission based on the message number corresponding to the standby starting time for each processor, the transmitting processor number corresponding to the standby starting time for each processor, and the message transmitting processor corresponding to the transmitting processor number in each processor; and maximum delay path obtaining means for obtaining a maximum delay path indicating the longest route of the message transmission by repeatedly searching each processor from the last processor to the starting processor.

11. A performance evaluation device for a parallel computer according to claim 10, wherein said maximum delay path obtaining means comprises said comparing means and said searching means.

12. A performance evaluation device for a parallel computer according to claim 10, wherein said memorizing means, said comparing means and said searching means is provided in each of the plurality of processors, and wherein comparison processing in said comparing means is carried out by said comparing means in parallel with the search processing in said searching means in each processor.

13. A performance evaluation device for a parallel computer according to claim 10, the device further comprising:

barrier synchronous control means for interrupting processing of the processor until all of the processors issue a barrier synchronous signal with a synchronous number for execution of said parallel processing, said memorizing means further stores the synchronous number of said barrier synchronous signal and the time the signal is transmitted, said comparing means compares said barrier synchronous numbers and the time the signal is transmitted with each other; and said searching means obtains said maximum delay path by means of searching the processor which has lastly issued the barrier synchronous number.

14. A performance evaluation device for a parallel computer according to claim 10, wherein said maximum delay path obtaining means further comprises a displaying means for displaying said maximum delay path.

15. A performance evaluation device for a parallel computer according to claim 14, wherein said displaying means displays a maximum delay path and a message flow of the path wherein one axis on the display representing the time and the other axis represents processors.

16. A performance evaluation device for a parallel computer according to claim 14, wherein said displaying means also displays the waiting state for said message when displaying said maximum delay path.

17. A performance evaluation device for a parallel computer according to claim 14, wherein said displaying means also displays the number of each of said processors being used.

18. A performance evaluation method for a parallel computer having a plurality of processors for carrying out a parallel processing in each processor comprising;

originating a message from a starting processor;

transmitting the message among the plurality of 6 processors;

storing information in each processor regarding the parallel processing, including when a message was received by a particular processor, a standby starting time, and when the message was forwarded by the particular processor;

identifying the processor in which the message was last received based on the information stored in each processor; and tracing a longest message transmitting route from the last processor to the starting processor by:
   searching the standby starting time for reception of the message in the processor to obtain a waiting time interval;
   searching a message number and a transmitting processor number in the processor to obtain the longest message transmitting route;
   searching a message transmitting processor corresponding to the transmitting processor number to obtain the longest message transmitting route; and
   repeating from the step for searching the standby starting time for each processor from the last processor to starting processor to obtain the maximum delay path.

19. A performance evaluation method, as set forth in claim 18, wherein the step of storing information in each processor comprises:

memorizing an execution starting time of the parallel processing;

memorizing a standby starting time for reception of the message;

memorizing a message number, a transmitting processor number and time the message was received on reception of the message;

memorizing a message number, and a time the message was transmitted on transmitting the message.

20. A performance evaluation method, as set forth in claim 19, wherein said identifying step comprises:

identifying the last processor in which the execution was completed in accordance with each time obtained in the step for memorizing execution ending time in each processor.

21. A performance evaluation method, as set forth in claim 18, wherein when processing carried out by the processor is interrupted until said all of the processors issue a barrier synchronous signal with a synchronous number on execution of said parallel processing, the step of storing information further comprises:

memorizing a barrier synchronous number from a barrier synchronous signal and the time when the signal was received; and the step of tracing a longest message transmission route further includes searching a processor which has lastly issued the barrier synchronous number and the time received prior to the step of repeating.

* * * * *